US006947544B2

(12) United States Patent
Yamartino

(10) Patent No.: US 6,947,544 B2
(45) Date of Patent: Sep. 20, 2005

(54) TELEPHONE NUMBER AREA CODE PREPROCESSOR

(76) Inventor: Robert J. Yamartino, 509 Chandler's Wharf, Portland, ME (US) 04101

(*) Notice: Subject to any disclaimer, the term of this patent is extended or adjusted under 35 U.S.C. 154(b) by 125 days.

(21) Appl. No.: 10/090,004

(22) Filed: Mar. 5, 2002

(65) Prior Publication Data

US 2002/0131578 A1 Sep. 19, 2002

Related U.S. Application Data

(63) Continuation-in-part of application No. 10/024,033, filed on Dec. 21, 2001, which is a continuation of application No. 09/291,213, filed on Apr. 14, 1999, now Pat. No. 6,345,095
(60) Provisional application No. 60/081,735, filed on Apr. 14, 1998.

(51) Int. Cl.$^7$ .............................................. H04M 1/00
(52) U.S. Cl. ................................................. 379/355.08
(58) Field of Search .................................... 379/201.01

(56) References Cited

U.S. PATENT DOCUMENTS

| 4,945,557 A | 7/1990 | Kaneuchi et al. |
| 5,157,719 A | 10/1992 | Waldman |
| 5,272,749 A | 12/1993 | Masek |
| 5,329,578 A | 7/1994 | Brennan et al. |
| 5,481,603 A | 1/1996 | Gutierrez et al. |
| 5,515,426 A | 5/1996 | Yacenda et al. |
| 5,553,119 A | 9/1996 | McAllister et al. |
| 5,583,926 A | 12/1996 | Venier et al. |
| 5,613,006 A | 3/1997 | Reese |
| 5,694,457 A | 12/1997 | Nixon |
| 5,706,339 A | 1/1998 | Eisdorfer et al. |
| 5,710,808 A | 1/1998 | Eaton |
| 5,719,931 A | 2/1998 | Johnson |
| 5,732,132 A | 3/1998 | Hamada |
| 5,859,896 A | 1/1999 | Rosen |
| 5,859,901 A | 1/1999 | Brendzel et al. |
| 5,917,904 A | 6/1999 | Theis |
| 5,946,390 A | 8/1999 | Boakes |
| 6,009,158 A | 12/1999 | Romero |
| 6,016,342 A | 1/2000 | Schwartz |
| 6,134,319 A | 10/2000 | Burg et al. |
| 6,154,535 A | 11/2000 | Velamuri et al. |
| 6,169,799 B1 | 1/2001 | McIntosh |
| 6,236,867 B1 * | 5/2001 | Todo et al. ................. 455/563 |
| 6,292,557 B1 | 9/2001 | Gabara |
| 6,345,095 B1 | 2/2002 | Yamartino |
| 6,349,212 B1 * | 2/2002 | Martensson et al. ........ 455/462 |
| 6,658,455 B1 * | 12/2003 | Weinman, Jr. .............. 709/203 |

FOREIGN PATENT DOCUMENTS

| WO | WO 99/53675 | 10/1999 |
| WO | WO 00/22799 | 4/2000 |

* cited by examiner

*Primary Examiner*—Creighton Smith
(74) *Attorney, Agent, or Firm*—Covington & Burling

(57) ABSTRACT

This invention provides an apparatus and method for processing telephone numbers that assists telephone subscribers in reaching the desired destination when the area code is unknown or has changed. The invention can be integrated into a telephone unit, implemented as a stand-alone device connected to the subscriber's telephone line (including wireless, cable-TV lines, and other modes of telecommunication), implemented as a utility on a personal computer that may or may not be connected to the Internet or to a telephone line, or implemented as part of the telephone switching system. In a preferred embodiment, the apparatus for processing telephone numbers includes an area code processor and a caller interface. The area code processor has means, which are responsive to information about the called party, for producing a list of telephone numbers. The caller interface communicates with the area code processor and a calling party; and has means for monitoring call initiation signals, means for receiving called party information such as a telephone number, and means for selecting a target telephone number from the list of telephone numbers produced by the area code processor.

46 Claims, 2 Drawing Sheets though the use of identical exchange codes in adjoining area code service areas is generally avoided, it is not uncommon for the same exchange code to be used in different area codes. For example, the exchange code 555 is used in many area codes throughout the country.

TELEPHONE NUMBER AREA CODE PREPROCESSOR

PRIORITY

This application claims priority and is a continuation in part to U.S. application Ser. No. 10/024,033, filed Dec. 21, 2001, which is a continuation of U.S. application Ser. No. 09/291,213, filed Apr. 14, 1999, which issued on Feb. 5, 2002 as U.S. Pat. No. 6,345,095B1, and which claims priorty to provisional U.S. patent application Ser. No. 60/081,735, filed Apr. 14, 1998. The specification of U.S. application Ser. No. 10/024,033 and of U.S. application Ser. No. 09/291,213 are incorporated herein by reference.

BACKGROUND OF THE INVENTION

This invention relates to the selection of telephone numbers, and more particularly to devices and methods for assisting telephone subscribers in connecting to the desired destination when the area code or service code is unknown or has changed.

DESCRIPTION OF THE RELEVANT ART

In North America, the telecommunications numbering plan generally divides the country into geographical area code service areas. Each three-digit area code is divided into three-digit central office exchanges that generally cover geographical sub-areas of the area code service area. In the early days of telephony, the geographical sub-area served by a particular exchange would not generally overlap the geographical sub-area served by another exchange. Further, the geographical sub-areas of area codes were often established with sensitivity to existing political boundaries so that residents of a particular community, for example, shared the same area code.

Unfortunately, the number of subscribers that can be served by a particular exchange is limited by the number of digits that can uniquely identify a subscriber line within the exchange. The use of four-digit subscriber numbers limits the number of subscribers within an exchange to 10,000 telephone numbers. As particular geographical sub-areas develop, however, they may eventually require more than 10,000 subscriber numbers. This problem is typically resolved by defining new exchanges whose geographical sub-areas may overlap the geographical sub-areas of existing exchanges. However, with the exception of wireless exchanges, the geographical sub-area covered by a particular exchange is generally completely confined to a particular area code service area. This restriction ensures that duplicate three-digit central office exchange codes may be freely assigned in adjoining area code service areas.

The use of identical exchange codes in adjoining area code service areas, however, may create ambiguities when subscribers dial numbers outside of their local exchange. These ambiguities are resolved by requiring subscribers to include area codes when dialing such numbers. In earlier days, central office exchanges were known by mnemonics and most subscribers making local calls were only required to memorize a four or five digit number and an appropriate mnemonic (e.g., POplar 55399). Now, however, subscribers may be frequently required to enter a three-digit area code, a three-digit exchange code, and a four digit subscriber number plus other access numbers that may be required.

The recent rapid increases in the number of fax machines and cellular/mobile phones has only increased the rapid utilization of available phone numbers. As with subscriber numbers, exchange codes have also been completely utilized in some area codes in the U.S. This has made it necessary to add additional area codes in densely populated areas by splitting the existing area code domain into two or more separate area codes. Whereas only a few years ago (circa 1990), an area code might apply to an entire state in the United States, the ensuing proliferation of area codes has reached the point where four different area codes might lie within a radius of several miles. Further, the advent of area code overlay has led to a situation where multiple area codes can coexist at a single point, requiring 10-digit dialing even for local calls. The result is confusion and complexity for the telephone user. Calls placed without the appropriate or new three-digit, destination area code currently result frequently in either an undesired connection, a phone company message about an area code change, or a recorded message that the number is simply not in service. In any of these events, the user is forced to redial the call using the revised "full" telephone number, provided that the caller can easily find that revised number. The full telephone number includes all digits, including area code and other prefix digits such as "0" or "1", that may be needed to reach the desired destination in the desired manner.

A number of aids have been developed to help subscribers formulate correct telephone numbers. Auto-dialers, for example, are well-known devices that enable subscribers to generate complete telephone numbers based on pre-programmed hot-keys or special code sequences; however, autodialers assume that the caller already knows the currently correct phone number. Autodialer data that has not been updated to reflect the latest area code changes will also yield the same frustrating results mentioned previously. A more sophisticated area code aid is described in U.S. Pat. No. 5,859,901, entitled "Intelligent Call Connection Service" and issued Jan. 12, 1999, to Brendzel et al. The Brendzel system operates on dialed sequences that do not contain area codes, and attempts to provide an appropriate area code by analyzing the called party number relative to the calling party. The analysis performed by the Brendzel system includes consideration of the calling pattern of the calling subscriber, and the distance between the calling party and the called party.

Despite the conveniences provided by auto-dialers and devices such as that described in the Brendzel patent, there remains a need for subscriber aids that will permit the subscriber to choose conveniently and efficiently the most appropriate area code by providing the subscriber with an analysis of any telephone number. The subscriber, for example, may desire to call a telephone number in a remote city (herein, "telephone number" refers to the exchange code and the subscriber number combination without area code) and may know an area code for that region, state or city. If the subscriber were presented with a list of valid area codes, within some proximity to the remote city, for the telephone number, then the subscriber could select the telephone number and area code combination that seemed most likely to be correct.

SUMMARY OF THE INVENTION

An object of the invention is to provide an automated system that would help telephone users select the proper area code for a call.

A further object of the invention is to provide an automated system for processing telephone numbers that responds to an activation sequence.

A further object of the invention is to provide an automated system for processing telephone numbers that utilizes identification information associated with the calling party in suggesting proper area codes for a call.

A further object of the invention is to provide an automated system for processing telephone numbers that utilizes a telephone number database that includes information on the relationship of area code service areas.

The present invention, as broadly described herein, provides an apparatus for processing telephone numbers that includes an area code processor and a caller interface. The area code processor has means, which are responsive to information about the called party, for producing a list of telephone numbers. The caller interface is in communication with the area code processor and a calling party, and has means for monitoring call initiation signals, means for receiving called party information that is responsive to the monitoring means, and means for selecting a target telephone number from the list of telephone numbers that is responsive to the means for producing a list of telephone numbers.

In a preferred embodiment of an apparatus of the present invention, the call initiation signals include an activation sequence.

In a preferred embodiment of an apparatus of the present invention, the receiving means includes means for associating identification information with the calling party.

In a preferred embodiment of an apparatus of the present invention, the telephone number database comprises information on valid area codes, information on the geographical areas associated with valid area codes, information on valid exchanges within valid area codes, information on geographical areas associated with valid exchanges, and information on the relationship of area code service areas.

In a preferred embodiment of an apparatus of the present invention, the means for producing a list of telephone numbers includes a database having information on any or all of the following: dialing rules (e.g., rules specifying the conditions requiring a "1" prefix for calls to certain locations, even within a single area code), a calling party dialing list, means for associating identification information, including location information, with the calling party. In preferred embodiments of an apparatus of the present invention, the means for producing a list of telephone numbers is responsive to the information in the database.

The additional objects and advantages of the invention are set forth in part in the description which follows, and in part are obvious from the description, or may be learned by practice of the invention. The objects and advantages of the invention may also be realized and attained by means of the instrumentalities and combinations particularly set out in the appended claims.

BRIEF DESCRIPTION OF THE DRAWINGS

The accompanying drawings, which are incorporated in and constitute part of the specification, illustrate preferred embodiments of the invention, and together with the description, serve to explain the principles of the invention.

DETAILED DESCRIPTION OF THE PREFERRED EMBODIMENTS

Reference will now be made in detail to the present preferred embodiments of the invention, examples of which are illustrated in the accompanying drawings.

Figure 1:
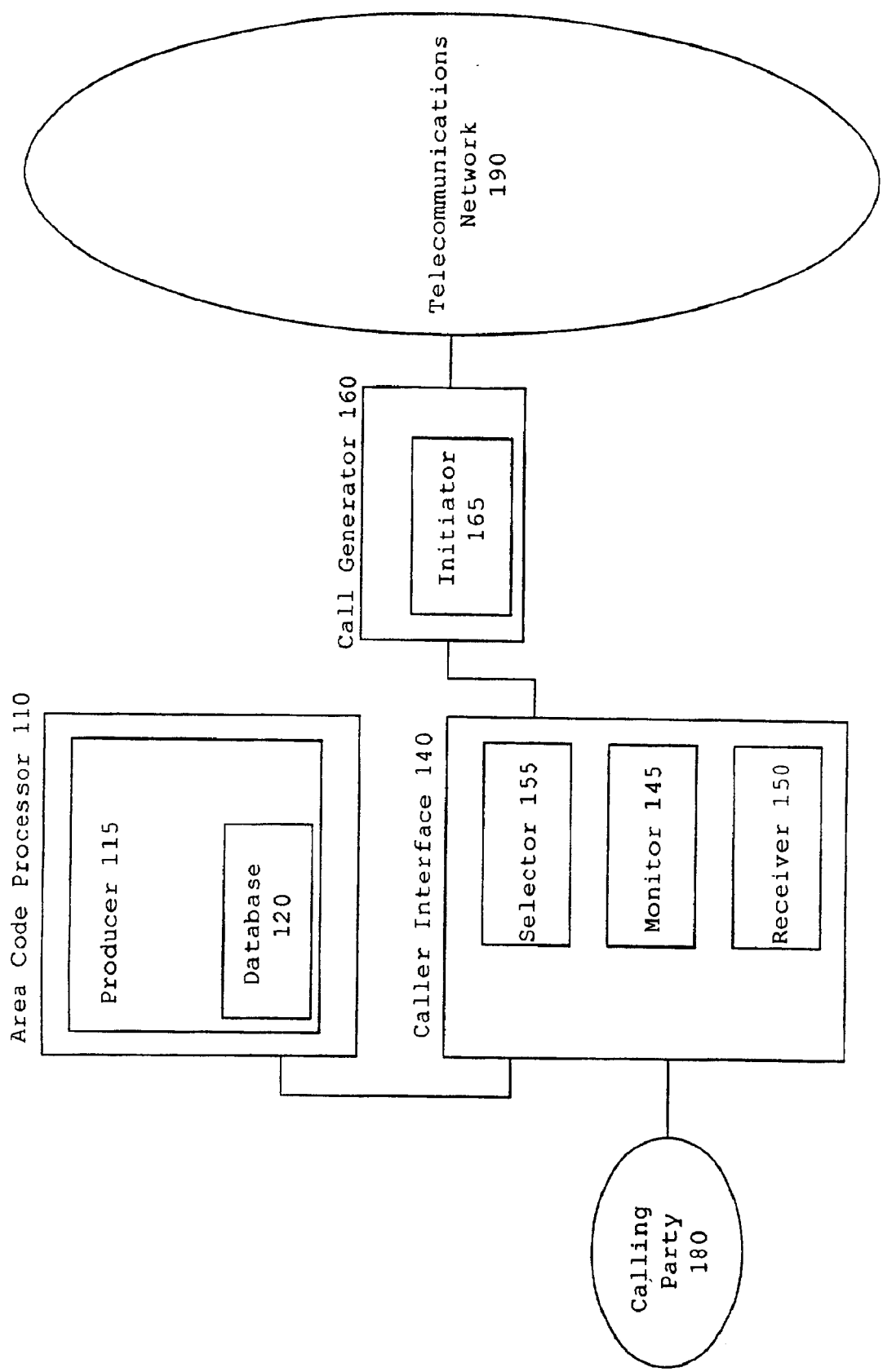
FIG. 1 is a diagram depicting preferred embodiments of an apparatus for processing telephone numbers.

FIG. 1 depicts preferred embodiments of an apparatus for processing telephone numbers. A preferred embodiment of the apparatus includes an area code processor and a caller interface. The area code processor has means, responsive to called party information, for producing a list of telephone numbers. The caller interface is in communication with the calling party and the area code processor, and has means for monitoring call initiation signals, means that are responsive to the monitoring means for receiving called party information, and means that are responsive to the producing means for selecting a target telephone number from the list of telephone numbers. A further preferred embodiment of the apparatus includes a call generator as well as the area code processor and the caller interface. The call generator has means for initiating a call to the target telephone number, and is responsive to the selecting means.

Preferred embodiments of the apparatus for processing telephone numbers of the present invention may be implemented in hardware, in software on general or special-purpose computer systems, or in a combination of hardware and software. These preferred embodiments may be integrated into a subscriber telephone unit, implemented as a stand-alone device connected to the subscriber's telephone line (including wireless, cable-TV lines, and other modes of telecommunication), implemented as a utility on a personal computer that may or may not be connected to the Internet or to a telephone line, or implemented as part of the telephone switching system. For example, in preferred embodiments, the present invention is implemented, as will be apparent to one of skill in the art in view of this specification and the appended claims, by hardware and/or software contained within handheld wireless subscriber telephone units such as mobile phones (including cellular phones). In alternative embodiments, the apparatus may be implemented as is known in the art.

The present invention may be employed with telephone systems using the North American Numbering Plan (NANP) or with other numbering schemes, including, for example, combinations of such numbering schemes as may be accessed through globally-enabled mobile phones or other subscriber telephone units. The NANP scheme consists of a four-digit subscriber number, a three-digit exchange code, and a three-digit area code. In operation, the present invention attempts to suggest appropriate area codes and exchange codes when presented with a subscriber number alone; and attempts to suggest appropriate area codes when presented with a subscriber number and an exchange code, or with a subscriber number, an exchange code and an area code. When using the present invention with non-NANP numbering schemes, it is necessary to relate, as is known in the art, appropriate portions of the non-NANP numbering scheme to the subscriber number, exchange code, and area code elements. In preferred embodiments, the present invention formulates target telephone numbers responsive to the relative locations of the calling party and the called party, and to the characteristics of the telephone systems being utilized.

In the preferred embodiments depicted in FIG. 1, the caller interface is Caller Interface 140. In this preferred embodiment, Caller Interface 140 is in communication with Calling Party 180 and with Area Code Processor 110. As is known in the art, Caller Interface 140 may be implemented in hardware, in software, or in a combination of hardware and software. In a preferred embodiment, Calling Party 180 is a subscriber using a subscriber telephone unit in communication with Caller Interface 140 through a standard subscriber telephone line. In an alternative preferred embodiment, Calling Party 180 is a personal computer user, Caller Interface 140 is implemented on a personal computer, and the personal computer user communicates with Caller Interface 140 through the keyboard and/or other input devices, as are known in the art, of the personal computer. In an alternative preferred embodiment, Calling Party 180 is a wireless mobile phone user, Caller Interface 140 is implemented on hardware and/or software contained within the mobile phone handset, and the wireless mobile phone user communicates with Caller Interface 140 through the input devices, as are known in the art, of the mobile phone handset. In a preferred embodiment, Calling Party 180 is a mobile phone user and Caller Interface 140 is implemented on hardware and/or software contained at the mobile telephone carrier's transmission tower, the mobile telephone switching center, or elsewhere as part of a telecommunications network as apparent to one of skill in the art in view of this specification and the appended claims. Calling Party 180 may access Caller Interface 140, in preferred embodiments, by other means as are known in the art.

In the preferred embodiments depicted in FIG. 1, the means for monitoring call initiation signals of the caller interface is Monitor 145. As is known in the art, Monitor 145 monitors call initiation signals emitted by Calling Party 180. In preferred embodiments, the call initiation signals may be standard telephone subscriber unit signaling or may be signals received from the input devices, including, for example, the keyboard, of a personal computer, as is known in the art, that indicate a desire by Calling Party 180 to utilize the apparatus of the present invention. In preferred embodiments, the call initiation signals comprise signals generated by Calling Party 180 in the course of accessing dialing assistance mechanisms such as speed dialers, autodialers, and voice-activated dialers.

In preferred embodiments, the apparatus of the present invention forms a transparent link between Calling Party 180 and a telecommunications network until Monitor 145 receives certain predesignated sequences as part of the call initiation signals. When one of these predesignated sequences is received, Monitor 145 activates, as is known in the art, the other functional elements of the present invention. For example, in a preferred embodiment, a predesignated sequence is four numerals followed by a long pause. When Calling Party 180 enters this predesignated sequence on his subscriber unit keypad, it is interpreted by Monitor 145 as signifying a desire to activate the present invention and the four numerals are interpreted as the four-digit subscriber number of a called party. In a preferred embodiment, the predesignated sequences are any call initiation signals that indicate that Calling Party 180 is attempting to place a telephone call. For example, in preferred embodiments, the predesignated sequences comprise the call initiation signals generated by Calling Party 180 in the course of or as a result of accessing dialing assistance mechanisms such as speed dialers, autodialers, and voice-activated dialers. In a preferred embodiment, the predesignated sequences comprise call initiation signals that include a full telephone number. In a further preferred embodiment, the predesignated sequences comprise call initiation signals that include a telephone number without an area code. In a preferred embodiment, the predesignated sequences comprise call initiation signals that include a subscriber number without an area code or an exchange code. In an alternative preferred embodiment, the call initiation signals may contain a particular activation sequence, as is known in the art, and the predesignated sequences include this activation sequence. In this alternative preferred embodiment, the activation sequence may include a code character selected from the group consisting of # and *. These code characters are particularly useful when Calling Party 180 is using a standard subscriber telephone unit to communicate with the present invention.

In the preferred embodiments depicted in FIG. 1, the means for receiving called party information of the caller interface is Receiver 150. As described above, Receiver 150 is responsive to Monitor 145 and remains inactive, as is known in the art, until Monitor 145 receives a predesignated sequence. In response to Monitor 145, Receiver 150 receives called party information from Calling Party 180. In preferred embodiments, the called party information may be received as signaling from a standard telephone subscriber unit, signaling received from the keyboard and/or other portions of a personal computer, or other signaling as may be known in the art for transmitting called party information. For example, in preferred embodiments, dialing assistance mechanisms such as speed dialers, autodialers, and voice-activated dialers generate called party information that is received by Receiver 150. Additional methods of communicating with Calling Party 180 are described below in connection with Selector 155. The called party information includes the subscriber number, and may also include the exchange code and/or the area code and/or other appropriate dialing codes such as access and country codes. As is known in the art, Receiver 150 makes the called party information available for use within Caller Interface 140 and Area Code Processor 110.

In a preferred embodiment, the Receiver 150 includes means for associating identification information with the calling party. For example, if the present invention is implemented at a central office location, then the central office provides Receiver 150 with identification information on the calling party, as is known in the art. In an alternative preferred embodiment, the calling party may provide a code or password to Receiver 150 that, in turn, is used by the associating means to access previously stored identification information for the calling party using the code or password. For example, in a preferred embodiment, if the present invention is accessed by means of a credit card call, then the credit card number would be used to access a "home" area code and exchange code associated with the owner of the credit card. In another example, in a preferred embodiment, a particular calling party is associated with a particular telephone subscriber unit, such as an office telephone subscriber unit. In another example, in a preferred embodiment, a particular calling party is associated with a particular wireless mobile phone handset. Other means may be employed for associating identification information with the calling party as are known in the art.

In a preferred embodiment, the calling party identification information includes calling party location information. In a preferred embodiment, this calling party location information is a pre-designated "home" location for the calling party. In an alternative preferred embodiment, this calling party location information is derived from the telephone number of the telephone subscriber unit being used by Calling Party 180 to access the apparatus of the present invention. In a preferred embodiment, information carried by mobile phone protocols is used, as is known in the art, to determine the calling party's current geographic position, localized to the geographic area or areas served by the particular mobile telephone cell or cells that are in communication with the calling party's mobile telephone when a call is placed. As is known in the art, the calling party's mobile telephone is generally localized sufficiently, for example by a cell tower's transmitted identification codes (e.g., the Station Identifier Code, SIC, Base Station Identifier Code, BSIC, or other identifiers), to permit determination from within the mobile phone of the appropriate dialing rules for a call. In preferred embodiments, and as is known in the art, the mobile phone of the calling party transmits identifying information (e.g., the Mobile Identification Number, MIN, equivalent to the subscriber's mobile phone number, the Electronic Service Number, ESN, and the System Identification Code, SID, of the mobile phone's home cellular system) that generally enables a determination, from within the Mobile Telephone Switching Office (MTSO), Mobile Switching Center (MSC) or other appropriately equipped location, of the dialing rules of the "home" location and of the current location of the calling party.

In the preferred embodiments depicted in FIG. 1, the means for selecting a target telephone number from the list of telephone numbers is Selector 155. In this preferred embodiment, Selector 155 is responsive to Producer 115, which is described below, and obtains the list of telephone numbers from Producer 115. As is known in the art, Selector 155 is an interactive user interface with Calling Party 180. Selector 155 presents Calling Party 180 with the list of telephone numbers and permits Calling Party 180 to select a target telephone number from the list of telephone numbers. In preferred embodiments, Selector 155 stores the target telephone number for future use, provides the target telephone number to an auto-dialer for storage and future use, or provides the target telephone number to a call generator for initiation of a telephone call, as is known in the art, between Calling Party 180 and the target telephone number. If the list of telephone numbers contains only a single telephone number, then, in a preferred embodiment, Selector 155 automatically designates the single telephone number to be the target telephone number. In this case, however, in preferred embodiments, Selector 155 will still present the single telephone number to Calling Party 180 so that Calling Party 180 may note it.

As described below in connection with Producer 115, the list of telephone numbers may include valid telephone numbers in area code service areas within a predetermined scope responsive to calling party location information. When Selector 155 presents this list of telephone numbers to Calling Party 180, Calling Party 180 may determine that the predetermined scope is too narrow. In this case, Calling Party 180 can signal Selector 155 to request, as is known in the art, a new search by Area Code Processor 110 based on a predetermined expanded-scope. This request is communicated by Selector 155 to Area Code Processor 110.

As is known in the art, Selector 155 may perform other user interface functions related to controlling the operation of the apparatus of the present invention. For example, Calling Party 180 may select formats for the display of the list of telephone numbers through interaction with Selector 155.

The methods used by Selector 155 to interact with Calling Party 180 depend on the equipment used by Calling Party 180 to communicate with the apparatus of the present invention. If Calling Party 180 is using a standard telephone subscriber unit, then, as is known in the art, Calling Party 180 may use the touchpad of the subscriber unit while Selector 155 uses a voice synthesizer. If a subscriber unit used by Calling Party 180 includes a display screen, then Selector 155 may communicate using the display screen, or a voice synthesizer, or both. Similarly, if Calling Party 180 is using a personal computer, then Calling Party 180 may use the computer keyboard while Selector 155 communicates with Calling Party 180 through the computer's display screen, through a voice synthesizer, or both. A wide variety of other user interface devices may also be employed as are known in the art.

In the preferred embodiments depicted in FIG. 1, the area code processor is Area Code Processor 110. In the preferred embodiments, Area Code Processor 110 is in communication with Caller Interface 140. As is known in the art, Area Code Processor 110 may be implemented in hardware, in software, or in a combination of hardware and software. In a preferred embodiment Area Code Processor 110 is implemented as software on a personal computer. In a preferred embodiment, Calling Party 180 is a wireless mobile phone user and Area Code Processor 110 is implemented on hardware and/or software contained within the mobile phone handset and apparent to one of skill in the art in view of this specification and the appended claims. In a preferred embodiment, Calling Party 180 is a mobile phone user and Area Code Processor 110 is implemented on hardware and/or software contained at the mobile telephone carrier's transmission tower, the mobile telephone switching center, or elsewhere as part of a telecommunications network as apparent to one of skill in the art in view of this specification and the appended claims.

In the preferred embodiments depicted in FIG. 1, the means for producing a list of telephone numbers of the area code processor is Producer 115. In preferred embodiments, Producer 115 is responsive to called party information obtained from Caller Interface 140 and produces a list of telephone numbers. The called party information is information provided by Calling Party 180 concerning the desired called party in a telephone call. The called party information may include a subscriber number alone, the subscriber number in combination with an exchange code, or a subscriber number in combination with an exchange code and an area code.

In the preferred embodiments depicted in FIG. 1, Producer 115 includes telephone number Database 120. In a preferred embodiment, telephone number Database 120 includes information on valid area codes, information on the geographical areas associated with valid area codes, information on valid exchanges within valid area codes, and information on geographical areas associated with valid exchanges. As used herein in reference to telephone number Database 120, the word "valid" merely means that a telephone company or NANP Administrator has made the number or area code in question available for service. It does not mean that a particular number is actually in service at a particular time. "Geographical areas" generally refers to political divisions such cities, towns, suburbs, and regions, but may, in preferred embodiments, refer to geographical coordinates, the geographical coverage of particular cells associated with mobile telephone systems, or to other indicators of spatial location as are known in the art.

For example, in a preferred embodiment, Database 120 includes international, national, and local dialing rules for selected geographical areas for use in determining the appropriate dialing codes to be used when calling from a particular geographical area, to a particular geographical area, where the called-from and called-to geographical areas are defined by the conventions and structure of the relevant telephone systems in which the call is originated and terminated. In preferred embodiments, a mobile phone or other subscriber telephone unit containing an implementation of the present invention comprises a full set of worldwide dialing rules for use in making calls from any geographical location to any geographical location. In preferred embodiments, a mobile phone or other subscriber telephone unit contains only a subset of the worldwide dialing rules, for example, those dialing rules that are relevant to the geographical areas from and to which the calling party using the mobile phone expects to place calls.

In preferred embodiments, Database 120 includes telephone numbers accessible by dialing assistance mechanisms such as speed dialers, autodialers, and voice activated dialers, as is known in the art. These telephone numbers are referred to collectively herein as the "calling party dialing list."

In a preferred embodiment, Producer 115 includes means, as are known in the art, for updating Database 120. For example, if the apparatus of the present invention is implemented on a personal computer, then Database 120 may be periodically updated by contacting a dial-up server or a server on the Internet. If the apparatus of the present invention is connected to a public switched telephone network, then Database 120 may be updated by dialing into a special database update site. In preferred embodiments, Database 120 is updated from information transmitted from a telephone network associated with a particular subscriber telephone unit. For example, and in a preferred embodiment, Database 120 is contained in a mobile telephone handset, and is updated automatically from transmissions from the telephone network associated with the mobile telephone handset. In preferred embodiments, Database 120 is updated in response to a manual request by a user of the present invention. In situations where updating Database 120 is difficult, it may be beneficial to limit the amount of information included in Database 120 to information, such as area codes and exchange codes, that do not change as frequently as, for example, subscriber numbers.

In response to the called party information, Producer 115 produces, with reference to telephone number Database 120, a list of telephone numbers. This list of telephone numbers contains only valid telephone numbers, as determined by telephone number Database 120, that are related to the called party information. For example, if the called party information includes a subscriber number, an exchange code, and an area code, then Producer 115 determines from Database 120, as is known in the art, if the given area code and exchange code combination is valid. If the combination is valid then the list of telephone numbers produced by Producer 115 includes the given subscriber number, exchange code, and area code, along with information concerning the geographical area or other available information associated with the exchange code and area code combination. The list of telephone numbers and other information is passed by Caller Interface 140 to Calling Party 180. If the combination is not valid, then this discrepancy is passed to Caller Interface 140 for transmission to Calling Party 180.

In a preferred embodiment, telephone number Database 120 additionally includes information on the valid subscriber telephone numbers within valid exchanges. In a preferred embodiment, information concerning subscribers, such as their names, is stored in Database 120 and associated with the valid subscriber telephone numbers. Similarly to the previous example, if the called party information includes a subscriber number, an exchange code, and an area code, then Producer 115 determines from Database 120, as is known in the art, if the given area code, exchange code, and subscriber number combination is valid and proceeds as in the previous example, where, however, information concerning subscribers, associated with telephone numbers on the list of telephone numbers, could also be made known to Calling Party 180.

In a preferred embodiment, telephone number Database 120 additionally includes information on the relationship of area code service areas. In preferred embodiments, this relationship information may indicate the geographic proximity of area code service areas to each other, or may indicate the likelihood that a call to a particular area code service area was, in fact, intended for a different particular area code service area. As an example of the latter, a call to a number in the 301 area code in western Maryland, which includes areas close to Washington, D.C., may have been intended for the 202 area code in Washington, D.C., the 703 area code in northern Virginia which also includes areas close to Washington, D.C., or the 240 area code that overlays the 301 area code. A call to a number in the 301 area code could, however, have been intended for other area codes in the region such as area code 410 in eastern Maryland, the 443 overlay area code of area code 410, area code 302 in Delaware, or area code 717 in Pennsylvania. Two predetermined standards of scope, based on information on the relationships between area code service areas, may be created so that certain area codes are designated to be within a predetermined scope of a specific area code, while those and additional area codes may be designated to be within a predetermined expanded-scope of that area code. Continuing the 301 western Maryland area code example, the predetermined scope of the 301 area code could be the 301, 703, 202, and the 240 area codes, while the predetermined expanded scope could be the 301, 703, 202, 240, 410, 443, 302, and 717 area codes. Area codes assigned to wireless service, in whole or in part, may be part of the predetermined scope or the predetermined expanded-scope of a specific area code.

In a preferred embodiment, at least one predesignated area code service area is considered to be within the predetermined scope. In a further preferred embodiment, at least one predesignated area code is a toll-free service access code. In some situations it may be desirable to consider at least one area code service area to be within the predetermined scope of all other area code service areas. For example, if a particular Calling Party 180 very frequently calls a particular area code service area, then it may be desirable to assume that any calls made by that Calling Party 180 may be intended for that particular area code service area. It may also be beneficial to assume that toll-free service access codes have nationwide service areas and are, therefore, within the predetermined scope of each other.

In preferred embodiments utilizing predetermined scope and predetermined expanded-scope designations, the list of telephone numbers produced by Producer 115 may include valid telephone numbers in area code service areas within a predetermined scope or an predetermined expanded-scope responsive to the called party information. For example, the called party information may include a valid subscriber number, exchange code, and area code for a telephone number ("the called number") in the San Francisco area. Using the predetermined scope designations, the list of telephone numbers presented to Calling Party 180 by Selector 155 would then include the called number, as well as other valid telephone numbers within the predetermined scope of the called number that have the same subscriber number and exchange code as the called number, but different area codes In this same example, but using the predetermined expanded-scope designations, the list of telephone numbers presented to Calling Party 180 by Selector 155 would include the called number, as well as other valid telephone numbers within the predetermined expanded-scope of the called number that have the same subscriber number and exchange code as the called number. Since the list of telephone numbers presented to Calling Party 180 by Selector 155 in both examples would include geographical information on the area code service areas of each number, Calling Party 180 could determined the most likely telephone number for the called party based on this geographical information.

Continuing consideration of preferred embodiments that utilize the predetermined scope and predetermined expanded-scope designations, an area code and an exchange code provided in the called party information may not be found to be a valid combination. In this case, the present invention assumes that the exchange code provided is correct and that the area code provided is in the predetermined scope or the predetermined expanded-scope of the correct area code of the called party. Thus, continuing the example and using the predetermined scope designations, the list of telephone numbers presented to the Calling Party 180 by Selector 155 would not include the called number but would include other valid telephone numbers within the predetermined scope of the called number that have the same subscriber number and exchange code as the called number. Similarly, but using the predetermined expanded-scope designations, the list of telephone numbers would not include the called number but would include other valid telephone numbers within the predetermined expanded-scope of the called number that have the same subscriber number and exchange code as the called number. In a preferred embodiment, when the called number is not found to be valid, Selector 155 provides this information to Calling Party 180 through a separate message, as is known in the art.

In the above examples, the apparatus of the present invention is able to provide useful information concerning the validity of telephone numbers without any reference to location or other information about Calling Party 180. The apparatus acquires additional utility, however, when information about Calling Party 180 is known.

As described above in reference to Receiver 150, in preferred embodiments, identification information is associated with the calling party, and this identification information includes calling party location information. In a preferred embodiment, the list of telephone numbers includes valid telephone numbers in area code service areas within a predetermined scope responsive to calling party location information. In a further preferred embodiment, the list of telephone numbers includes valid telephone numbers in area code service areas within an predetermined expanded-scope responsive to calling party location information. These preferred embodiments perform in a similar manner to the San Francisco example provided above where, however, the called party information does not include an area code. In these cases, an area code is derived from the calling party location information, as is known in the art, and is used as the area code of the called party. Thus, in preferred embodiments where calling party location information is available and where the called party area code is not provided, the predetermined scope or predetermined expanded-scope is determined with reference to the location of the calling party.

In a preferred embodiment, the called party information may include a subscriber number but no exchange code or area code. In this situation, the area code and exchange code derived from the calling party location information are added to the called party information, and the called party information is then processed by Producer 115 using predetermined scope and predetermined expanded-scope as described above. In this situation, in an alternative preferred embodiment, Database 120 further comprises information on the relationship of central office exchanges similar to the information on the relationship of area code service areas, and the predetermined scope and predetermined expanded-scope are defined for central office exchanges as well as area codes. In this alternative preferred embodiment, the area code and exchange codes derived from the calling party location information are added to the called party information, and the called party information is then processed by Producer 115 using predetermined scope or predetermined expanded-scope applied to both area codes and exchanges.

In preferred embodiments, Producer 115 is responsive to dialing rules and calling party dialing list contained in Database 120 as described below, and to calling party identification information. In preferred embodiments, when the calling party initiates a call to a called party whose telephone number is on the calling party dialing list, for example by using the speed dial feature on a mobile phone, Producer 115 evaluates the geographical area of the called party and the current geographical area of the calling party, and formulates one or more telephone numbers that include the appropriate dialing codes, in accordance with the applicable dialing rules. As described above, the geographical area of the calling party can be determined for example, from identification information transmitted by the cell that is currently serving the mobile telephone. In preferred embodiments, telephone numbers on the calling party dialing list are stored in forms that facilitate the determination of the geographical area of the called party by Producer 115. For example, telephone numbers on the calling party dialing list may be stored in a uniform format that includes a complete telephone number and country information. In another example, telephone numbers on the calling party dialing list may be stored in formats that are appropriate for use from a predetermined home location. Producer 115 would then adjust the telephone numbers for use in locations other than the home location as apparent to one of skill in the art in view of this specification and the appended claims.

In an example of an embodiments of the present invention, a calling party uses a mobile phone that implements the present invention. The calling party is located and has a home location in Portland, Maine, and stores certain telephone numbers on a speed dial list within the mobile phone. Thus, the speed dial list contains the telephone number of a local called party as 780-9999 in compliance with local dialing rules in effect at the time of the call. If the geographical location of the mobile phone is determined to be at the home location, then Producer 115, if it is invoked for this call, would formulate the called party's number as 780-9999. If the geographical location of the mobile phone is determined to be within the Maine area code of 207 but outside of the local calling area, then Producer 115 would formulate the called party's number as 207-780-9999. Continuing this example, if the geographical location of the mobile phone is determined to be in a particular foreign country, then Producer 115 would formulate the called party's number as, for example, 001-207-780-9999, where 001 is the international call prefix for the United States from that foreign country.

In the preferred embodiments depicted in FIG. 1, the call generator is Call Generator 160. In a preferred embodiment, Call Generator 160 is in communication with Caller Interface 140 and Telecommunications Network 190. As is known in the art, Call Generator 160 may be implemented in hardware, in software, or in a combination of hardware and software. In a preferred embodiment, Calling Party 180 is a wireless mobile phone user and Call Generator 160 is implemented on hardware and/or software contained within the mobile phone handset. In another preferred embodiment, Calling Party 180 is a mobile phone user and Call Generator 160 is implemented on hardware and/or software contained at the mobile telephone carrier's transmission tower, the mobile telephone switching center, or elsewhere in a telecommunications network as would be apparent to one of skill in the art in view of this specification and the appended claims. In a preferred embodiment, Telecommunications Network 190 is a public switched telephone network. In an alternative preferred embodiment, Telecommunications Network 190 is the Internet. In preferred embodiments, and as is known in the art, Telecommunications Network 190 may be a public or private network, implemented using circuit switched, packet switched, or point-to-point communications techniques and technologies, and accessed through conventional wires, cable-TV lines, or wireless modes.

In a preferred embodiment depicted in FIG. 1, the means for initiating a call to the target telephone number of Call Generator 160 is Initiator 165. In this preferred embodiment, Initiator 165 is responsive to Selector 155. As described above, Selector 155 selects a target telephone number through interaction with Calling Party 180 and provides the target telephone number to Call Generator 160. Initiator 165 then, as is known in the art, initiates a telephone call to the target telephone number. In preferred embodiments, Calling Party 180 may, through interaction with Selector 155, direct Initiator 165 to abort the telephone call or to dial the telephone number, provided by Calling Party 180 as part of the called party information, exactly as provided. In a preferred embodiment, whenever the list of telephone numbers contains only a single telephone number, Selector 155 automatically designates the single telephone number as the target telephone number and provides that number to Call Generator 160 for initiation of a telephone call without consulting Calling Party 180.

Figure 2:
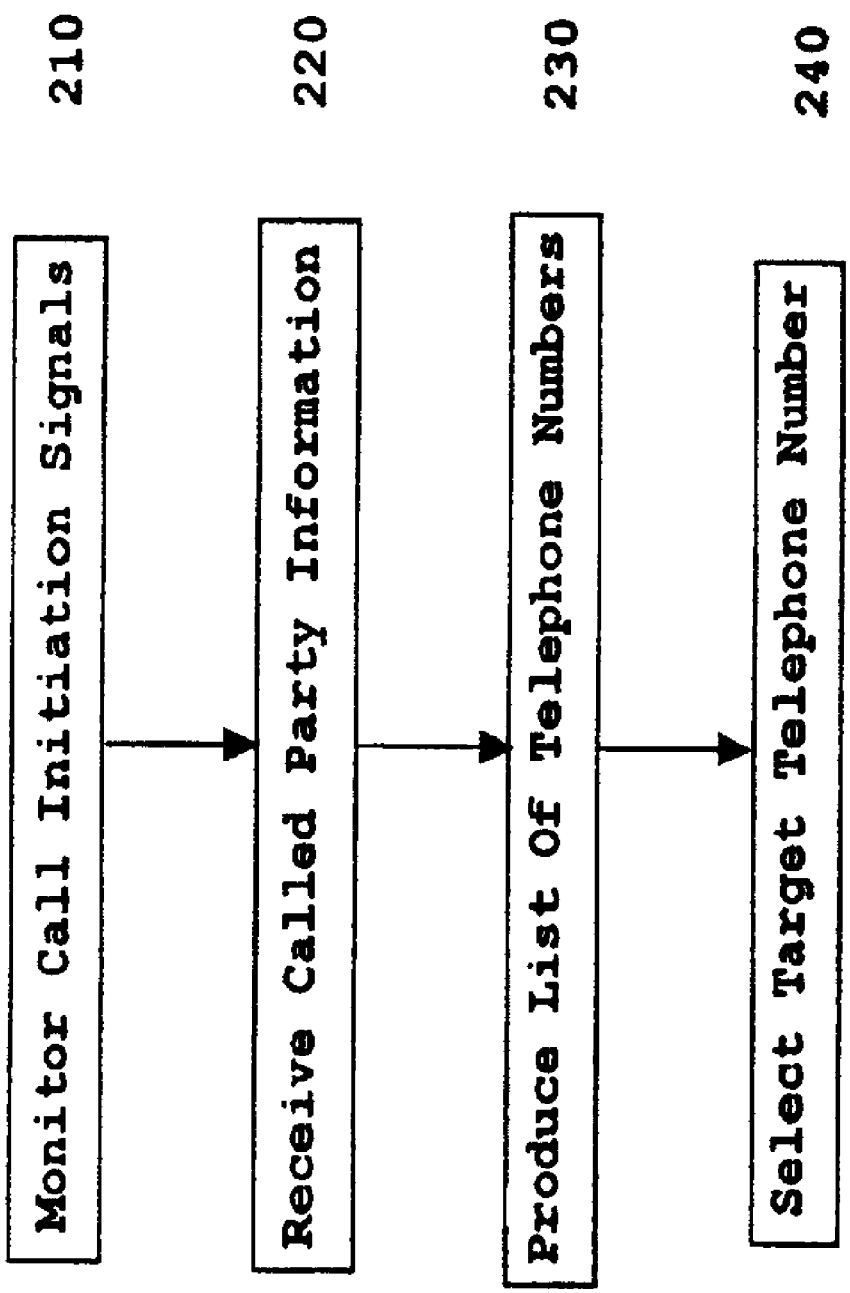
FIG. 2 is a flowchart depicting a preferred embodiment of a method for processing telephone numbers.

FIG. 2 depicts a flowchart of a preferred embodiment of a method for processing telephone numbers. This method includes the steps of monitoring call initiation signals from a calling party; receiving called party information in response to the monitoring step; producing a list of telephone numbers in response to the called party information; and selecting a target telephone number from the list of telephone numbers in response to the producing step. Preferred embodiments of the method for processing telephone numbers of the present invention may be implemented in hardware, in software on general or special-purpose computer systems, or in a combination of hardware and software. Integration of these preferred embodiments into subscriber telephone units, personal computers, or other devices, or into telecommunications networks, may be performed as described above in reference to FIG. 1.

In the preferred embodiment depicted in FIG. 2, the step of monitoring call initiation signals from a calling party is accomplished by Monitor Call Initiation Signals step 210. As is known in the art, Monitor Call Initiation Signals step 210 monitors call initiation signals emitted by a calling party. Additional information concerning the monitoring function and call initiation signals is provided above in reference to Monitor 145 and Calling Party 180 depicted in FIG. 1. In a preferred embodiment, the call initiation signals contain an activation sequence. In a further preferred embodiment, the activation sequence includes a code character selected from the group consisting of # and *. Additional information concerning activation sequences is also provided in reference to Monitor 145 depicted in FIG. 1.

In the preferred embodiment depicted in FIG. 2, the step of receiving called party information is accomplished by Receive Called Party Information step 220. In response to Monitor Call Initiation Signals step 210, Receive Called Party Information step 220 receives called party information from the calling party. Additional information concerning the receiving function and called party information is provided above in reference to Receiver 150 depicted in FIG. 1. In a preferred embodiment, Receive Called Party Information step 220 includes the step of associating identification information with the calling party. In a preferred embodiment, the identification information includes calling party location information. Additional information concerning identification information and calling party location information is provided above in reference to Receiver 150.

In the preferred embodiment depicted in FIG. 2, the step of producing a list of telephone numbers is accomplished by Produce List Of Telephone Numbers step 230. In response to the called party information, Produce List Of Telephone Numbers step 230 produces a list of telephone numbers. Additional information concerning the producing function is provided above in reference to Producer 115 depicted in FIG. 1. In a preferred embodiment, Produce List Of Telephone Numbers step 230 includes the use of a telephone number database. In a further preferred embodiment, the telephone number database includes information on valid area codes, information on the geographical areas associated with valid area codes, information on valid exchanges within valid area codes, and information on geographical areas associated with valid exchanges. In a further preferred embodiment, the telephone number database includes information on valid telephone numbers within valid exchanges.

For example, in a preferred embodiment, Database 120 includes international, national, and local dialing rules for selected geographical locations for use in determining the appropriate dialing codes to be used when calling from a particular geographical area to a particular geographical area. In preferred embodiments, a mobile phone or other subscriber telephone unit includes a full set of worldwide dialing rules for use in making calls from any geographical location to any geographical location. In preferred embodiments, a mobile phone or other subscriber telephone unit contains only a subset of the worldwide dialing rules, for example, those dialing rules that are relevant to the geographical areas from and to which the calling party using the mobile phone expects to place calls.

In preferred embodiments, Database 120 includes telephone numbers accessible by dialing assistance mechanisms such as speed dialers, autodialers, and voice activated dialers, as is known in the art.

In a preferred embodiment, Produce List Of Telephone Numbers step 230 includes the step of updating the telephone number database. Additional information concerning the database updating function is provided above in reference to Producer 115 and Database 120, depicted in FIG. 1.

In a preferred embodiment, the telephone number database includes information on the relationship of area code service areas. As described above in more detail in reference to Database 120, depicted in FIG. 1, in preferred embodiments, this relationship information may indicate the geographic proximity of area code service areas to each other, or may indicate the likelihood that a call to a particular area code service area was, in fact, intended for a different particular area code service area. Two predetermined standards of scope based on relationship information may be created so that certain area codes are designated to be within a predetermined scope of a specific area code, while those and additional area codes may be designated to be within an predetermined expanded-scope of the specific area code.

In a preferred embodiment, the list of telephone numbers includes valid telephone numbers in area code service areas within a predetermined scope responsive to calling party location information. In a further preferred embodiment, the list of telephone numbers includes valid telephone numbers in area code service areas within an predetermined expanded-scope responsive to the calling party location information. Additional information concerning the predetermined scope and the predetermined expanded-scope are provided above in reference to Database 120, depicted in FIG. 1.

In a preferred embodiment, at least one predesignated area code service area is considered to be within the predetermined scope. In a further preferred embodiment, at least one pre-designated area code is a toll-free service access code. Additional information concerning pre-designated area code service areas and toll-free service access codes is provided above in reference to Database 120 depicted in FIG. 1.

In the preferred embodiment depicted in FIG. 2, the step of selecting a target telephone number from the list of telephone numbers is accomplished by Select Target Telephone Number step 240. In response to Produce List Of Telephone Numbers step 230, Select Target Telephone Numbers step 240 obtains the list of telephone numbers, presents the calling party with the list of telephone numbers, and permits the calling party to select the target telephone number from the list. Additional information concerning the selection function is provided above in reference to Selector 155, depicted in FIG. 1.

In a preferred embodiment not depicted in FIG. 2, the method for processing telephone numbers of the present invention includes the steps of monitoring call initiation signals from a calling party; receiving called party information in response to the monitoring step; producing a list of telephone numbers in response to the called party information; selecting a target telephone number from the list of telephone numbers in response to the producing step; and initiating a call to the target telephone number through a telecommunications network in response to the selecting step. In a preferred embodiment, the monitoring step, the receiving step, the producing step, and the selecting step are performed as described above in reference to FIG. 2. In a preferred embodiment, the step of initiating a call to the target telephone number through a telecommunications network is performed by initiating a telephone call, as is known in the art and in response to the selecting step, to the target telephone number. Additional information concerning the initiating function and the telecommunications network is provided above in reference to Call Generator 160, depicted in FIG. 1.

An Example

A mobile phone that does not utilize the present invention generally does not make use of any geographical information, beyond the fact that the phone determines if it is within or outside of the phone's home calling area. Thus, the user of the mobile phone must determine the appropriate dialing codes. Although this may be relatively easy if the user is in a location that requires an area code familiar to the user, it may render many of the entries in the mobile phone's autodialer unusable and may result in repeated recorded phone messages to the user to "hang up and dial again," as the user experiments with various dialing codes. If the mobile phone is used in a foreign country, the user may not understand any recorded foreign-language messages that are received, or know the proper dialing codes needed to reach the intended called party.

Some aspects of the present invention can be illustrated by considering the travels of an American mobile phone user as he slowly migrates from his mobile phone's "home" calling area to an overseas location in Germany. For this example, the American mobile phone user has a home calling area in Portland, Me., a state presently served by the single area code (207) and which generally permits 7-digit in-state calling. Within the home calling area, the caller knows that: (1) all local calls may be dialed with 7-digits, (2) out-of-state calls must be dialed with 10-digits (i.e., NPA-NXX-SUBN, where SUBN stands for the 4-digit subscriber number, NXX stands for the central office code, and NPA stands for the area code); and (3) international calls require the leading digits "011" from the Unitied States or "00" from many foreign countries to indicate an international call, followed by a 1-, 2-, or 3-digit country code (CC) and the called party's subscriber number of up to 10-digits. This example assumes that the mobile phone user has programmed various phone numbers into the mobile phone's auto-dialer.

If the mobile phone does not utilize the present invention, then, when the mobile phone user places a call to home and is 20–50 miles from home, but still within the home area code of 207, the user will find that the 7-digit dialing capability fails and the call must be re-placed using the area code. Thus, all the 7-digit numbers within the autodialer memory become useless, and calls involving these numbers must be manually dialed using 10-digits. Similarly, voice-activated commands, such as "call home" will fail under these same circumstances if those numbers were stored as 7-digit numbers.

In the circumstances described in the previous paragraph, the present invention would aid the mobile phone user in completing his call without redialing. In particular, the present invention would use information received by the mobile phone from the transmission tower supporting the mobile phone to determine that the phone is outside of its home area and may also determine that 7-digit calls initiated from the auto-dialer would require insertion the 207 prefix.

The mobile phone user then travels to New Hampshire, which uses area code 603, to pick up the first of two international traveling companions. His first companion advises the mobile phone user that he should call ahead to check on the second traveling companion, who also is located in New Hampshire. The mobile phone user hands the phone to his companion and asks him to call. As the New Hampshire companion is accustomed to dialing 7-digits in New Hampshire, he dials only those 7-digits. If the mobile phone does not utilize the present invention, then the New Hampshire companion receives a message to redial using 10-digits. If, however, the mobile phone does utilize the present invention, then the caller could complete the call without redialing. In particular, and in some embodiments, the present invention would recognize that a non-auto-dialer, 7-digit call was being made from a non-home location in New Hampshire, and would prompt the caller with appropriate area code choices for New Hampshire, such as 603 and, depending on the scope, 207 and other area codes from other geographically close locations. As described above, invalid combinations of area codes and exchanges would not be offered as choices, thus reducing choices.

Finally, the mobile phone user and his companions arrive in Frankfurt, Germany and wish to contact their German business hosts, before boarding their final flight to Berlin. The mobile phone user from Maine is using a globally-enabled mobile phone and had entered phone numbers of the German contact people into the autodialer, as he would dial them from home. The mobile phone user dials his principal German host, located in Berlin, using a number stored as 011-49-30-xxxxxxx in the autodialer. If the mobile phone does not utilize the present invention then the mobile phone user may receive a failure message in German. The mobile phone user may eventually determine that the USA-appropriate, 011-49 prefix is incorrect from Frankfurt, and that he must redial the number as 030-xxxxxxx. If the mobile phone does utilize the present invention, then it would analyze the original autodialer number; determine that it was appropriate only from the U.S.; determine that the phone was presently connected with a tower in the Frankfurt, Germany, area and not in Berlin; strip off the 011-49 prefix; and add the leading 0 (as required in dialing between German cities); and complete the call.

The 7-digit dialing ambiguity described above with reference to roaming mobile calls is an example of aspects of the present invention that some individuals may prefer to handle differently, in accordance with their personal preferences. For example, and in preferred embodiments, some users will prefer that their home area code is always used. In alternative preferred embodiments, some users will prefer to make a choice between the home area code, the local area code, or selected distant area codes. In preferred embodiments, the present invention will contain one or more setup menus, as would be apparent to one of skill in the art in view of this specification and the appended claims, which are used by users to configure the present invention in accordance with the user's personal preferences. For example, and in a preferred embodiment, a setup menu would customize the processing of the 7-digit ambiguity by permitting the user of the present invention to select an option, as follows: "After manual entry of a 7-digit number, (a) always prompt me concerning valid area code choices, (b) always dial my home area code only, (c) always dial the local area code I am within, (d) always provide me with at least N feasible area code choices." In preferred embodiments, the selection of option (d) would result in a further prompt asking the user for the maximum number of nearby area codes to be checked (e.g., 8) or for a list of area codes that are user-preferred candidate choices. For example, a user who resides in Maine but frequently calls business associates in California may provide a list of frequently-utilized California area codes. In preferred embodiments, the setup menu or menus may be preprogrammed with default values so that users will not be required to access the setup menus before the users' first use of the present invention. As described above, particular instances of the present invention may be used by multiple users and mechanisms may be provided to identify particular users (i.e., calling parties). In preferred embodiments, the setup preferences of each user of a particular instance of the present invention will be recorded and employed when the instance of the present invention identifies a particular user.

It will be apparent to those skilled in the art that various modifications can be made to this invention of an apparatus and method for processing telephone numbers, without departing from the scope or spirit of the invention or of the claims. It is also intended that the present invention and appended claims cover modifications, variations, and equivalents of the apparatus and method for processing telephone numbers of the present invention.

I claim:

1. An apparatus for processing telephone numbers, comprising:
   an area code processor having
      means, responsive to called party information, for producing a list of telephone numbers, the list-producing means comprising:
         a telephone number database comprising
            dialing rules for formulating telephone numbers for use in making calls from one of a multiplicity of geographic locations to another of the multiplicity of geographic locations; and
      a caller interface, in communication with a calling party and the area code processor, having
         means for monitoring call initiation signals,
         means, responsive to the monitoring means, for receiving called party information, and
         means, responsive to the producing means, for selecting a target telephone number from the list of telephone numbers.

2. The apparatus for processing telephone numbers of claim 1, wherein
   the telephone number database further comprises
      a calling party dialing list.

3. The apparatus for processing telephone numbers of claim 1, further comprising:
   means for associating identification information with the calling party.

4. The apparatus for processing telephone numbers of claim 3, wherein the identification information associated with the calling party comprises calling party location information.

5. The apparatus for processing telephone numbers of claim 4, wherein the producing means is further responsive to the dialing rules, the calling party dialing list, and the identification information associated with the calling party.

6. An apparatus for processing telephone numbers, comprising:
   an area code processor having
      means, responsive to called party information, for producing a list of telephone numbers, the list-producing means comprising:
         a telephone number database comprising
            any of information on valid area codes, information on the geographical areas associated with valid area codes, information on valid exchanges within valid area codes, and information on geographical areas associated with valid exchanges; and
            dialing rules for formulating telephone number for use in making calls from one of a multiplicity of geographic locations to another of the multiplicity of geographic locations; and
      a caller interface, in communication with a calling party and the area code processor, having
         means for monitoring call initiation signals,
         means, responsive to the monitoring means, for receiving called party information, and
         means, responsive to the producing means, for selecting a target telephone number from the list of telephone numbers.

7. The apparatus for processing telephone numbers of claim 6, wherein the telephone number database further comprises a calling party dialing list.

8. The apparatus for processing telephone numbers of claim 6, wherein the telephone number database further comprises information on valid telephone numbers within valid exchanges.

9. The apparatus for processing telephone numbers of claim 6, wherein the telephone number database further comprises information on the relationship of each of a plurality of area code service areas.

10. An apparatus for processing telephone numbers, comprising:
   an area code processor, and
   a caller interface, in communication with a calling party and the area code processor, having
      means for monitoring call initiation signals, and
      means, responsive to the monitoring means, for receiving called party information and calling party identification information,
   wherein the area code processor comprises means, responsive to the called party identification information and dialing rules for formulating telephone numbers for use in making calls from one of a multiplicity of geographic locations to another of the multiplicity of geographic locations, for producing a target telephone number.

11. The apparatus for processing telephone numbers of claim 10, wherein the calling party identification information includes calling party location information.

12. The apparatus for processing telephone numbers of claim 10, wherein the producing means comprises a telephone number database.

13. The apparatus for processing telephone numbers of claim 12, wherein the telephone number database comprises the dialing rules.

14. The apparatus for processing telephone numbers of claim 13, wherein the telephone number database further comprises a calling party dialing list.

15. The apparatus for processing telephone numbers of claim 14, wherein the producing means is further responsive to the calling party dialing list.

16. The apparatus for processing telephone numbers of claim 10, further comprising a call generator, in communication with the caller interface and a telecommunications network, having means for initiating a call to the target telephone number.

17. An apparatus for processing telephone numbers, comprising:
an area code processor having means, responsive to called party information, calling party identification and dialing rules of formulating telephone numbers for use in making calls from one of a multiplicity of geographic locations to another of the multiplicity of geographic locations, for producing a list of telephone numbers; and
a caller interface, in communication with a calling party and the area code processor, having
means for monitoring call initiation signals,
means, responsive to the monitoring means, for receiving the called party information and the calling party identification information, and
means, responsive to the producing means, for selecting a target telephone number from the list of telephone numbers.

18. The apparatus for processing telephone numbers of claim 17, wherein the calling party identification information includes calling party location information.

19. The apparatus for processing telephone numbers of claim 17, wherein the producing means comprises a telephone number database.

20. The apparatus for processing telephone numbers of claim 19, wherein the telephone number database comprises the dialing rules.

21. The apparatus for processing telephone numbers of claim 20, wherein the telephone number database further comprises a calling party dialing list.

22. The apparatus for processing telephone numbers of claim 21, wherein the producing means is further responsive to the calling party dialing list.

23. The apparatus for processing telephone numbers of claim 17, further comprising a call generator, in communication with the caller interface and a telecommunications network, having means for initiating a call to the target telephone number.

24. A method for processing telephone numbers, comprising the steps of:
monitoring call initiation signals from a calling party;
receiving, responsive to the monitoring step, called party information;
producing, responsive to the called party information, a list of telephone numbers, comprising the use of a telephone number database,
wherein the telephone number database comprises dialing rules for formulating telephone numbers for use in making calls from one of a multiplicity of geographic locations to another of the multiplicity of geographic locations; and
selecting, responsive to the producing step, a target telephone number from the list of telephone numbers.

25. A method for processing telephone numbers, comprising the steps of:
monitoring call initiation signals from a calling party;
receiving, responsive to the monitoring step, called party information;
producing, responsive to the called party information and dialing rules for formulating telephone numbers for use in making calls from one of a multiplicity of geographic locations to another of the multiplicity of geographic locations, a list of telephone numbers, comprising the use of a telephone number database, wherein the telephone number database comprises a calling party dialing list; and
selecting, responsive to the producing step, a target telephone number from the list of telephone numbers.

26. A method for processing telephone numbers, comprising the steps of:
monitoring call initiation signals from a calling party;
receiving, responsive to the monitoring step, called party information;
producing, responsive to the called party information and dialing rule for formulating telephone numbers for use in making calls from one of a multiplicity of geographic locations to another of the multiplicity of geographic locations, a list of telephone numbers;
selecting, responsive to the producing step, a target telephone number from the list of telephone numbers; and
associating identification information with the calling party.

27. The method for processing telephone numbers of claim 26, wherein the identification information associated with the calling party comprises calling party location information.

28. The method for processing telephone numbers of claim 27, wherein the producing step is further responsive to a calling party dialing list, and the identification information associated with the calling party.

29. A method for processing telephone numbers, comprising the steps of:
monitoring call initiation signals from a calling party;
receiving, responsive to the monitoring step, called party information;
producing, responsive to the called party information, a list of telephone numbers, comprising the use of a telephone number database,
wherein the telephone number database comprises any of information on valid area codes, information on the geographical areas associated with valid area codes, information on valid exchanges within valid area codes, information on geographical areas associated with valid exchanges, and dialing rules for formulating telephone numbers for use in making calls from one of a multiplicity of geographic locations to another of the multiplicity of geographic locations; and
selecting, responsive to the producing step, a target telephone number from the list of telephone numbers.

30. The method for processing telephone numbers of claim 29, wherein the telephone number database further comprises a calling party dialing list.

31. The method for processing telephone numbers of claim 29, wherein the telephone number database further comprises information on valid telephone numbers within valid exchanges.

32. The method for processing telephone numbers of claim 29, wherein the telephone number database further comprises information on the relationship of each of a plurality of area code services areas.

33. A method for processing telephone numbers, comprising the steps of:

monitoring call initiation signals from a calling party;

receiving, responsive to the monitoring step, called party information and calling party identification information; and producing, responsive to the called party information, the calling party identification information, and dialing rules for formulating telephone numbers for use in making calls from one of a multiplicity of geographic locations to another of the multiplicity of geographic locations, a target telephone number.

34. The method for processing telephone numbers of claim 33, wherein the calling party identification information includes calling party location information.

35. The method for processing telephone numbers of claim 33, wherein the producing step comprises the use of a telephone number database.

36. The method for processing telephone numbers of claim 35, wherein the telephone number database comprises the dialing rules.

37. The method for processing telephone numbers of claim 36, wherein the telephone number database further comprises a calling party dialing list.

38. The method for processing telephone numbers of claim 37, wherein the producing step is responsive to the dialing rules and the calling party dialing list.

39. The method for processing telephone numbers of claim 33, further comprising the step of initiating a call to the target telephone number.

40. A method for processing telephone numbers, comprising the steps of:

monitoring call initiation signals from a calling party;

receiving, responsive to the monitoring step, called party information and calling party identification information;

producing, responsive to the called party information, the calling party identification information, and dialing rules for formulating telephone numbers for use in making calls from one of a multiplicity of geographic locations to another of the multiplicity of geographic locations, a list of telephone numbers; and selecting, responsive to the producing step, a target telephone number from the list of telephone numbers.

41. The method for processing telephone numbers of claim 40, wherein the calling party identification information includes calling party location information.

42. The method for processing telephone numbers of claim 40, wherein the producing step comprises the use of a telephone number database.

43. The method for processing telephone numbers of claim 42, wherein the telephone number database comprises the dialing rules.

44. The method for processing telephone numbers of claim 43, wherein the telephone number database further comprises a calling party dialing list.

45. The method for processing telephone numbers of claim 44, wherein the producing step is responsive to the dialing rules and the calling party dialing list.

46. The method for processing telephone numbers of claim 40, further comprising the step of initiating a call to the target telephone number.

* * * * *

UNITED STATES PATENT AND TRADEMARK OFFICE
CERTIFICATE OF CORRECTION

PATENT NO. : 6,947,544 B2
DATED : September 20, 2005
INVENTOR(S) : Robert J. Yamartino It is certified that error appears in the above-identified patent and that said Letters Patent is hereby corrected as shown below:

<u>Title page,</u>
Item [56], References Cited, add
-- OTHER PUBLICATIONS
Mohl, B., Globe Staff, Duo Market Area Code Auto-dialer, Boston Globe Online (2/10/99). --.

<u>Column 18,</u>
Line 14, "number" should read -- numbers --.

<u>Column 19,</u>
Line 4, "identification and" should read -- identification information and --.
Line 5, "of formulating" should read -- for formulating --.

<u>Column 20,</u>
Line 7, "rule" should read -- rules --.

Signed and Sealed this

Fourteenth Day of March, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,947,544 B2 |
| APPLICATION NO. | : 10/090004 |
| DATED | : September 20, 2005 |
| INVENTOR(S) | : Robert J. Yamartino |

Page 1 of 1

It is certified that error appears in the above-identified patent and that said Letters Patent is hereby corrected as shown below:

On the TITLE PAGE, ITEM (56) References Cited, the following U.S. Patent Documents should be added:

| | | |
|---|---|---|
| 4,734,931 A | 3/1988 | Bourg et al. |
| 5,204,894 A | 4/1993 | Darden |
| 5,655,015 A | 8/1997 | Walsh et al. |
| 5,764,731 A | 6/1998 | Yablon |

Signed and Sealed this

Twelfth Day of September, 2006

JON W. DUDAS
*Director of the United States Patent and Trademark Office*